United States Patent
Wormbsächer et al.

[11] Patent Number: 5,509,855
[45] Date of Patent: Apr. 23, 1996

[54] CONSTANT VELOCITY UNIVERSAL BALL JOINT WITH NOISE-REDUCING CAGE STOP FACES

[75] Inventors: Hans Wormbsächer, Dreieich; Dieter Burghardt, Wiesbaden; Wolfgang Löbel, Frankfurt, all of Germany

[73] Assignee: GKN Automotive AG, Lohmar, Germany

[21] Appl. No.: 59,826

[22] Filed: May 7, 1993

[30] Foreign Application Priority Data

May 9, 1992 [DE] Germany .................. 42 15 218.6

[51] Int. Cl.[6] .................................................. F16D 3/224
[52] U.S. Cl. .................................... 464/145; 464/906
[58] Field of Search ..................... 464/144, 145, 464/146, 906; 384/526, 527, 492

[56] References Cited

U.S. PATENT DOCUMENTS

| | | | |
|---|---|---|---|
| 2,712,481 | 7/1955 | Martin | 384/526 |
| 4,223,963 | 9/1980 | Glodin et al. | 384/527 |
| 4,357,810 | 11/1982 | Kumpar | 464/145 |
| 4,432,741 | 2/1984 | Winkler | 464/145 |
| 4,487,595 | 12/1984 | Quick et al. | 384/492 |
| 4,846,764 | 7/1989 | Hazebrook et al. | 464/145 |
| 5,221,233 | 6/1993 | Jacob | 464/145 |
| 5,292,285 | 3/1994 | Ingalsbe et al. | 464/144 |

FOREIGN PATENT DOCUMENTS

| | | | |
|---|---|---|---|
| 2842679 | 6/1979 | Germany | 464/145 |
| 113822 | 6/1985 | Japan | 464/145 |
| 956894 | 4/1964 | United Kingdom | 464/144 |

*Primary Examiner*—Daniel P. Stodola
*Assistant Examiner*—Eileen A. Dunn
*Attorney, Agent, or Firm*—Harness, Dickey & Pierce

[57] ABSTRACT

A constant velocity universal ball joint has an outer joint part with substantially longitudinally extending outer ball tracks and an inner joint part with substantially longitudinally extending inner ball tracks. The tracks in the outer joint part and inner joint part are positioned radially opposite one another to form a pair and, in each case, jointly receiving a torque-transmitting ball. A ball cage includes circumferentially distributed cage windows, which hold the balls in a common plane and guides them on to the angle-bisecting plane when the joint is articulated. The cage windows, if viewed in the circumferential direction, narrow at their ends. Opposed flanks of the cage windows jointly form a stop relative to the respective balls if there occurs a relative circumferential displacement between the ball cage and balls.

3 Claims, 3 Drawing Sheets

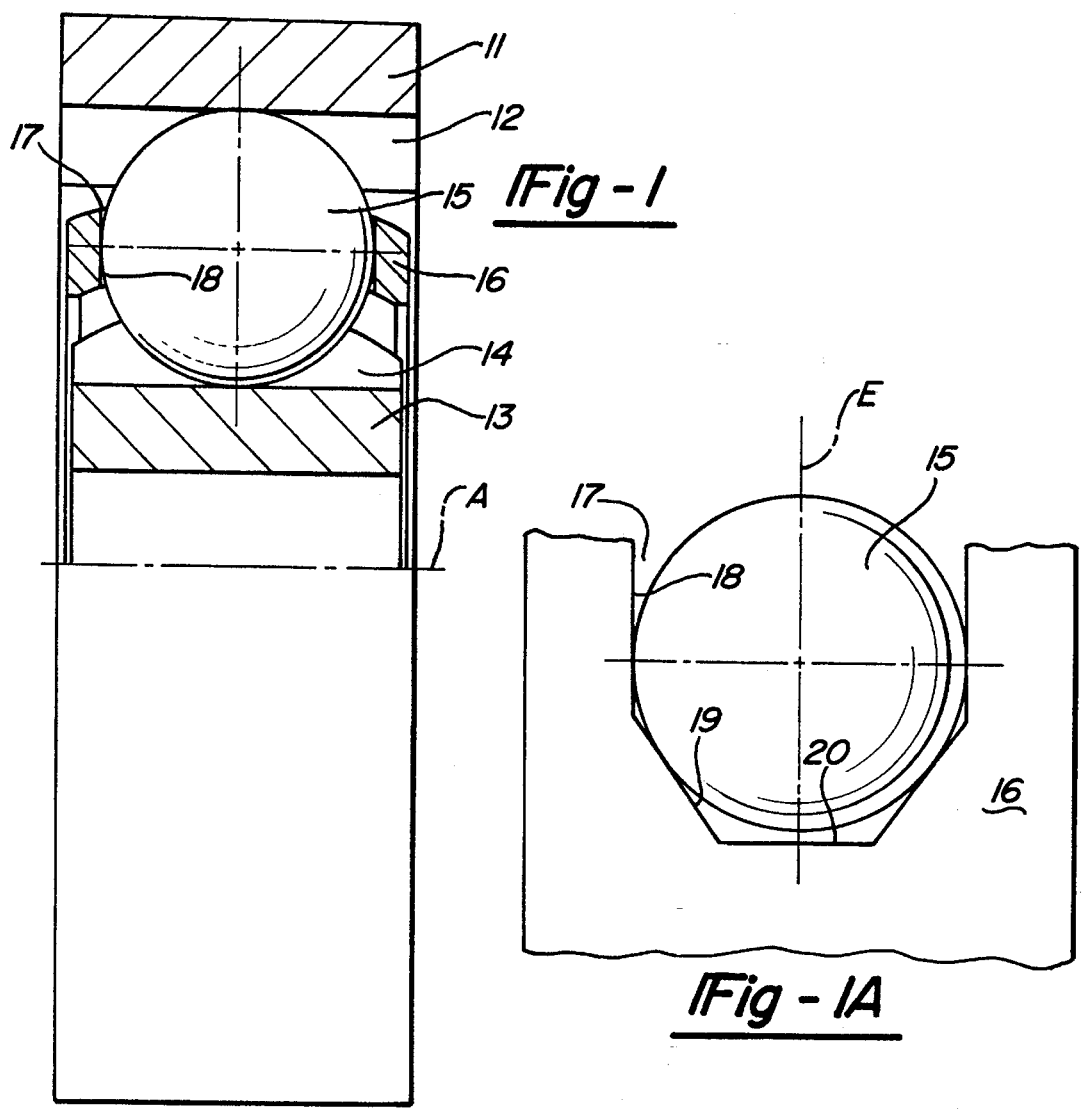
Fig - 1
Fig - 1A
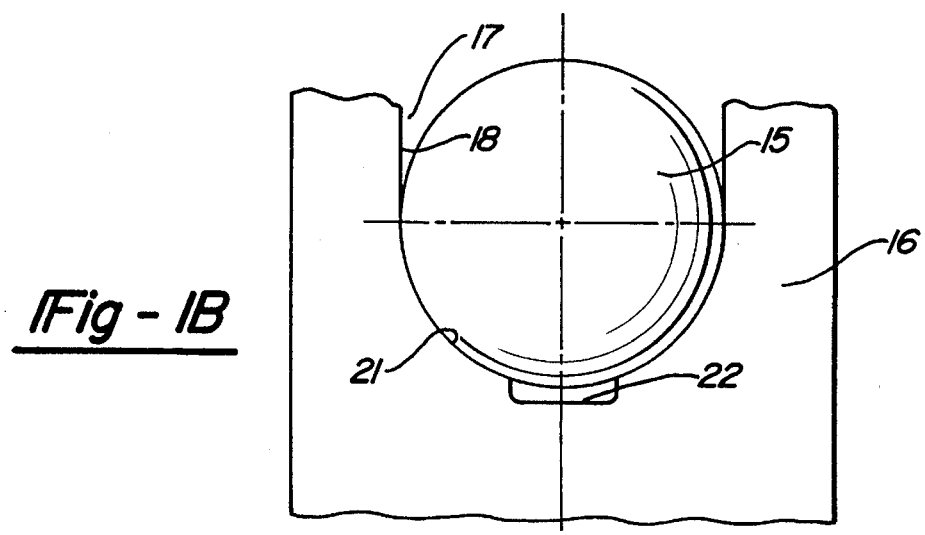
Fig - 1B

CONSTANT VELOCITY UNIVERSAL BALL JOINT WITH NOISE-REDUCING CAGE STOP FACES

BACKGROUND OF THE INVENTION

The invention relates to a constant velocity universal ball joint. The joint has an outer joint part with substantially longitudinally extending outer ball tracks and an inner joint part with substantially longitudinally extending inner ball tracks. The tracks in the outer joint part and inner joint part are positioned radially opposite one another to form a pair. In each case, the tracks jointly receive a torque-transmitting ball. A ball cage, in circumferentially distributed cage windows, holds the balls in a common plane and guides them upon articulation onto the angle-bisecting plane.

In particular, the invention relates to so-called VL joints where the tracks in the inner joint part and outer joint part form an angle in the longitudinal direction and relative to one another, which means the tracks do not extend exactly in the longitudinal direction. Joints of this type permit an axial displacement between the outer joint part and inner joint part, with the cage being guided onto half the relative displacement path. Furthermore, the invention refers to so-called Rzeppa fixed joints or undercut-free joints where the inner joint part and outer joint part are indirectly supported by a cage, via balls and cage windows, so as to be held in an axially immovable way relative to one another.

If such joints rotate in a torque-free condition, the position of the cage is indifferent. This means that, in view of the circumferential length of the cage windows, the cage when the joint is in an aligned position, is able, circumferentially, to adjust itself freely relative to the balls. When the joint is articulated, this indifferent position of the cage with its ability to freely adjust itself is only partially restricted. This degree of freedom allows the cage, to stop against the balls on alternate sides by contact of the region of its longitudinal webs between each two cage windows. The noise developing in the process is disadvantageous.

Furthermore, with joints of this type, there exists radial play between the outer face of the cage and the corresponding guiding inner face of the outer joint part, especially in the case of the cylindrical guiding faces of the outer joint part of a VL joint. In consequence, when the joint rotates in a torque-free condition, it is possible for the cage to move radially inside the outer joint part, which may also lead to a clattering noise. In the process, the cage may develop natural vibrations of high frequency. If, however, the cage rests against the outer joint part in an eccentric position, this leads to out-of-balance of the joint, which is also disadvantageous.

SUMMARY OF THE INVENTION

In view of the above, it is an object of the present invention to improve constant velocity universal ball joints by reducing the natural free movements of the ball cage which lead to a clattering noise.

A first solution includes a ball cage with ball windows which, in the circumferential direction, narrow at their ends. The opposed flanks of the cage windows jointly form a stop relative to the respective balls if there occurs a relative circumferential displacement between the ball cage and the balls.

The measure proposed above, in principle, does not completely prevent the relative circumferential displacement of the cage relative to the remaining joint components, however, the circumferentially narrowing flanks at the respective end of the cage window lead to improved noise behavior. If considered relatively, the balls run into the circumferentially narrowing flanks which, in a simple way, may be designed to be wedge-shaped.

Tapering of the flanks, in the circumferential direction, may also be effected in a circular arch from the diameter of the balls so that a linear abatement results and thus a soft stopping action occurs. In this context, it is advantageous to recess the region at the crown of the arch in order to avoid point-like contact between the ball and the flank. The solution is of equal importance for all the joint types mentioned.

A second solution includes a ball cage with cage windows which, in the axial cross section, through the ball cage narrow radially inwardly. The circumferentially extending flanks of the cage windows form a stop relative to the respective balls if there occurs a relative radial displacement between the ball cage and the balls. If the production accuracy is sufficiently high, the cage may be centered, via the flanks, such that any contact is avoided between the cage outer face and the inner guiding faces of the outer joint part. As a result, the noise referred to and the out-of-balance state is substantially eliminated.

The flanks of the cage windows may narrow radially inwardly in a wedge-like way in the axial cross section.

According to a further refined embodiment, at least part of the flank height, in the axial cross section through the ball cage, may be designed as a circular arch with the ball diameter and thus osculatingly rests against the ball shape.

The shape of the track flanks does not have to be limited to the circumferentially extending part, but may also be applied to the short end faces of the cage windows. Because of the soft stopping action, the design will already have an advantageous effect on the rattling noise due to circumferential movement of the cage relative to the balls. This especially applies if this design of the cage window flanks is combined with the characteristics of the first solution.

According to a further solution which represents an alternative to the latter one, at least one of the surfaces of the outer joint part and ball cage facing one another having a mutual guiding function is coated with a resilient material. The measures mentioned first and taken to prevent any rattling due to the relative circumferential movement may be applied to the cage windows at the same time. In addition, to simplify production, the cage windows may be punched out to be straight-flanked. In this case the relative radial displacement is limited or almost prevented by applying the coating in accordance with the invention while providing the metal parts used with the unchanged tolerances. To the extent that a relative radial movement is still possible, the stopping action of the cage relative to the corresponding inner guiding face in the outer joint part is dampened. Such a coating would be sprayed or steamed on. The two latter solutions are best suited to the so-called VL joints.

From the following detailed description taken in conjunction with the accompanying drawings and subjoined claims, other objects and advantages of the present invention will become apparent to those skilled in the art.

BRIEF DESCRIPTION OF THE DRAWINGS

Preferred embodiments of the invention will be explained with reference to the drawings wherein:

FIG. 1 is a partial axial cross sectional view of a joint according to a first embodiment in accordance With the invention.

FIG 1a is a detailed radial plan view of the cage according to FIG. 1.

FIG. 1b is a detailed radial plan view like FIG. 1a of a second embodiment,

DETAILED DESCRIPTION OF THE PREFERRED EMBODIMENTS

Figure 2:
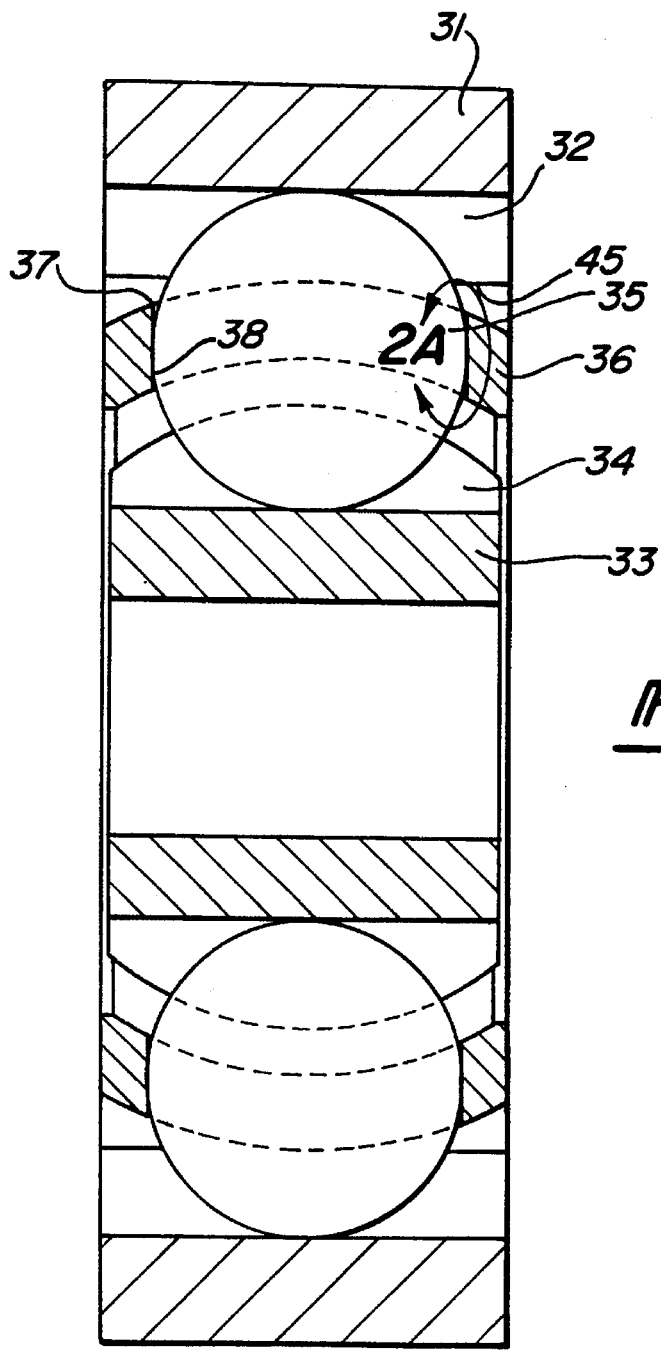
FIG. 2 is an axial cross sectional view of a joint according to a second embodiment in accordance with the invention.

FIG. 1 shows a so-called VL-joint having an outer joint part 11 with substantially longitudinally extending tracks 12, an inner joint part 13 with substantially longitudinally extending tracks 14, and balls 15 running in radially opposed tracks 12 and 14 arranged in pairs. Also, a ball cage 16 is included with the joint. The ball cage 16 holds the balls 15 in circumferentially distributed cage windows 17 in a common plane.

The center lines C (not illustrated in detail) of the ball tracks 12 and 14 cross the joint axis A at a distance and at opposed angles so that they intersect one another as well. Thus, in the case of a relative axial displacement of the joint parts 11 and 13, the balls 15 are guided onto half the relative displacement path, via the circumferentially extending flanks 18 of the cage windows 17, the balls 15 control the ball cage. In the circumferential direction, the cage windows 17 have a longitudinal extension so that, when the joint is not subjected to loads, the cage 16 is able to carry out a limited relative rotation around the axis A relative to the parts 11 and 13 and the balls 15.

In a radial view in FIG. 1a, the cage 16 is illustrated with a short portion of its circumferential extension. It is possible to identity one end of a cage window 17 the other end being substantially the same, between the longitudinally extending flanks 18 of the cage window 17 there is guided a ball 15. As a result of being guided by the flanks, the ball 15 is held in the central plane E of the cage. The end of the cage window 17 illustrated shows flank regions 19 which extend in a symmetrically wedge-shaped way and which form a stop face for the balls 15. As a result, direct contact of the balls with the edge 20 at the end face of the cage windows 17 is avoided.

FIG. 1b illustrates a detail similar to FIG. 1a with the same reference numbers. However, the longitudinally extending flanks 18 are followed by opposed run-out regions 21 which, in an arch-like way, osculatingly rest against the balls. Between regions 21, there is provided a central recess 22 which prevents point-like contact between the ball and the end of the cage window 17.

FIG. 2 illustrates a VL joint in which corresponding details are given reference numbers which are increased by 20 relative to FIG. 1 corresponding details will not be referred to in detail.

Figure 2A:
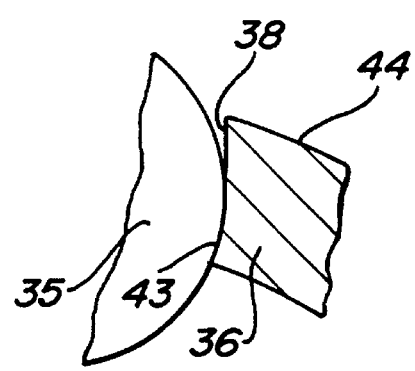
FIG. 2a is an enlarged detailed view with the box X of FIG. 2.

FIG. 2a shows the detail within box X of FIG. 2. FIG. 2a shows the longitudinally extending flanks 38 of the cage window 17 narrowing inwardly. From approximately half the wall thickness of the cage onwards, an arched region 43 osculatingly contacts the curvature of the balls 35 in the axial cross section. This enables the cage 36 to center itself radially on the balls 35. Thus, even when the joint rotates in a torque-free condition, any contact is avoided between the outer face 44 of the cage 36 and the inner guiding face 45 of the outer joint part 31.

Figures 3, 3A:
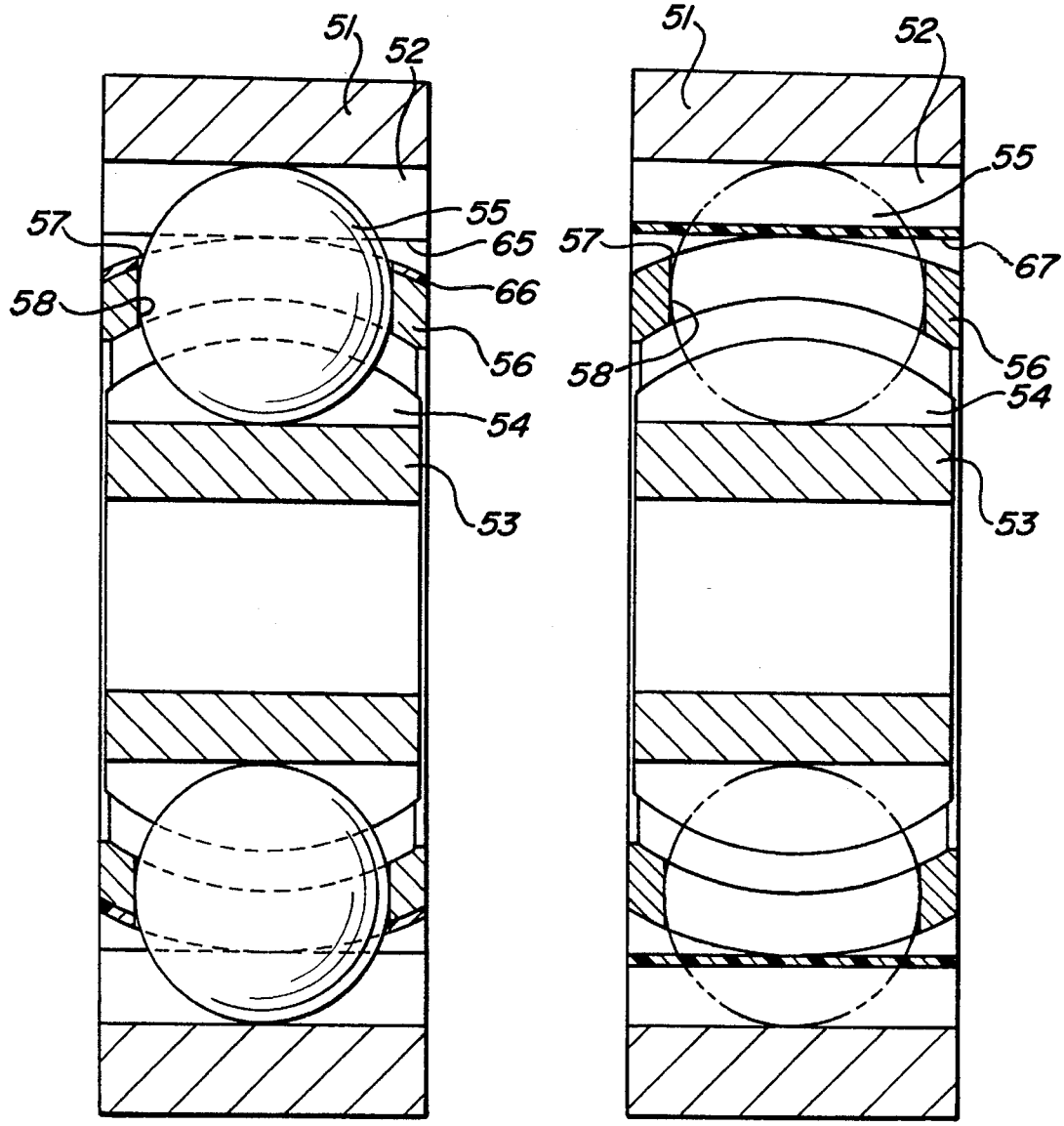
FIG. 3 is an axial cross sectional view of a joint according to a third embodiment in accordance with the invention.
FIG. 3A is a view like FIG. 3 of another embodiment of the present invention.

FIG. 3 again shows a VL joint of the same type as illustrated in FIGS. 1 and 2. Any details corresponding to those shown in FIG. 1 are given reference numbers increased by 40. No reference will be made to these details. In accordance with the invention, the cage 56, on its outside, is provided with a coating 66 which overcomes the play of the cage 56 relative to the inner face 65 of the outer joint part 51 and dampens any radial abating action. Also, a coating 67 may be present on the outer joint part 51.

While the above detailed description describes the preferred embodiment of the present invention, the invention is susceptible to modification, variation, and alteration without deviating from the scope and fair meaning of the subjoined claims.

We claim:

1. A constant velocity universal ball joint comprising:

an outer joint part with substantially longitudinally extending outer ball tracks;

an inner joint part with substantially longitudinally extending inner ball tracks, said tracks in the outer joint part and inner joint part being positioned radially opposite one another to form pairs;

torque-transmitting balls being received in said track pairs;

a ball cage including circumferentially distributed cage windows, said cage holding the balls in a common plane and guiding said balls on to the angle-bisecting plane when the joint is articulated, said cage windows having a greater extension than said balls in the circumferential direction and narrowing at their ends, opposed flanks of said cage windows jointly forming a stop relative to the respective balls during a relative circumferential displacement between the ball cage and the balls.

2. A constant velocity universal ball joint comprising:

an outer joint part with substantially longitudinally extending outer ball tracks;

an inner joint part with substantially longitudinally extending inner ball tracks, said tracks in the outer joint part and inner joint part being positioned radially opposite one another to form pairs;

torque-transmitting balls being jointly received in said track pairs; and a ball cage including circumferentially distributed cage windows, said cage holding the balls in a common plane and guiding said balls on to the angle-bisecting plane when the joint is articulated, said cage windows having a greater extension than said balls in the circumferential direction, and, in longitudinal section, said cage windows narrowing radially inwardly, circumferentially extending flanks of said cage windows forming a stop relative to the respective balls during a relative radial displacement between the ball cage and the balls.

3. A constant velocity universal ball joint comprising:

an outer joint part with substantially longitudinally extending outer ball tracks;

an inner joint part with substantially longitudinally extending inner ball tracks, said tracks in the outer joint part and inner joint part being positioned radially opposite one another to form pairs;

torque-transmitting balls being jointly received in said tracks;

a ball cage including circumferentially distributed cage windows, said cage holding the balls in a common plane and guiding the balls on to the angle-bisecting plane when the joint is articulated, said cage windows having a greater extension in the circumferential direction than said balls; and a resilient coating material on one of the mutual guiding surfaces of the outer joint part and ball cage facing one another.

* * * * *

UNITED STATES PATENT AND TRADEMARK OFFICE
CERTIFICATE OF CORRECTION

PATENT NO. : 5,509,855
DATED : April 23, 1996
INVENTOR(S) : Hans Wormsbächer, Dieter Burghardt and Wolfgang Löbel It is certified that error appears in the above-indentified patent and that said Letters Patent is hereby corrected as shown below:

On the cover page, the first inventor's name is misspelled in the heading and in the first column In the header, in the top portion of the printed patent

Wormbsächer et al should be Wormsbächer et al and

Column 1 of the cover page:

"[75] Inventors: Hans Wormbsächer, Dreieich; Dieter Burghardt, Wiesbaden; Wolfgang Löbel, Frankfurt, all of Germany"

should be

--[75] Inventors: Hans Wormsbächer, Dreieich; Dieter Burghardt, Wiesbaden; Wolfgang Löbel, Frankfurt, all of Germany--

Column 2 of the cover page, under [56] References Cited under FOREIGN PATENT DOCUMENTS, please add the following patents which were not included on the printed patent:

| | | |
|---|---|---|
| 1876790 | 3/1963 | Germany |
| 2430025 | 5/1975 | Germany |
| 5773227 | 5/1982 | Japan |
| 389025 | 4/1991 | Japan |
| 3277821 | 12/1991 | Japan |

UNITED STATES PATENT AND TRADEMARK OFFICE
CERTIFICATE OF CORRECTION

PATENT NO. : 5,509,855

DATED : April 23, 1996

INVENTOR(S) : Hans Wormsbächer, Dieter Burghardt and Wolfgang Löbel

It is certified that error appears in the above-indentified patent and that said Letters Patent is hereby corrected as shown below:

Column 2, line 66, "With," should be --with--

Column 3, line 4, after "embodiment" "," should be --.--

Column 3, line 10, after "invention" "," should be --.--

Column 3, line 59, after "Figure 1" insert --.-- and "corresponding" should be --Corresponding--

Signed and Sealed this

Twelfth Day of November, 1996

Attest:

BRUCE LEHMAN

Attesting Officer     Commissioner of Patents and Trademarks